(12) United States Patent
Wu et al.

(10) Patent No.: US 7,827,027 B2
(45) Date of Patent: Nov. 2, 2010

(54) METHOD AND APPARATUS FOR BILINGUAL WORD ALIGNMENT, METHOD AND APPARATUS FOR TRAINING BILINGUAL WORD ALIGNMENT MODEL

(75) Inventors: Hua Wu, Don Cheng District (CN); Haifeng Wang, Don Cheng District (CN); Zhanyi Liu, Don Cheng District (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 835 days.

(21) Appl. No.: 11/678,364

(22) Filed: Feb. 23, 2007

(65) Prior Publication Data

US 2007/0203689 A1 Aug. 30, 2007

(30) Foreign Application Priority Data

Feb. 28, 2006 (CN) ............ 2006 1 0058072

(51) Int. Cl.
*G06F 17/28* (2006.01)
(52) U.S. Cl. ............ 704/2; 704/4; 704/5; 704/7; 704/8
(58) Field of Classification Search ............ 704/2–8, 704/264; 715/264
See application file for complete search history.

(56) References Cited

U.S. PATENT DOCUMENTS

| | | | | |
|---|---|---|---|---|
| 5,893,134 | A * | 4/1999 | O'Donoghue et al. ...... | 715/264 |
| 6,092,034 | A * | 7/2000 | McCarley et al. ............ | 704/2 |
| 6,236,958 | B1 * | 5/2001 | Lange et al. ................. | 704/8 |
| 6,304,841 | B1 * | 10/2001 | Berger et al. ................ | 704/2 |
| 7,191,115 | B2 * | 3/2007 | Moore ......................... | 704/2 |
| 7,194,455 | B2 * | 3/2007 | Zhou et al. ................... | 707/3 |
| 7,249,012 | B2 * | 7/2007 | Moore ......................... | 704/4 |
| 7,318,022 | B2 * | 1/2008 | Li ................................ | 704/10 |
| 7,349,839 | B2 * | 3/2008 | Moore ......................... | 704/2 |
| 7,366,654 | B2 * | 4/2008 | Moore ......................... | 704/2 |
| 7,475,010 | B2 * | 1/2009 | Chao ........................... | 704/10 |
| 7,593,843 | B2 * | 9/2009 | Aue et al. ..................... | 704/2 |
| 2006/0015320 | A1 * | 1/2006 | Och ............................. | 704/2 |
| 2006/0190241 | A1 * | 8/2006 | Goutte et al. ................ | 704/2 |
| 2007/0005337 | A1 * | 1/2007 | Mount et al. ................. | 704/2 |

OTHER PUBLICATIONS

Wu et al., Improving Domain-Specific Word Alignment with a General Bilingual Corpus, 2004, Springer, pp. 262-271.*

(Continued)

*Primary Examiner*—David R Hudspeth
*Assistant Examiner*—Lamont M Spooner
(74) *Attorney, Agent, or Firm*—Oblon, Spivak, McClelland, Maier & Neustadt, L.L.P.

(57) ABSTRACT

The present invention provides method and apparatus for bilingual word alignment, method and apparatus for training bilingual word alignment model. The method for bilingual word alignment, comprising: training a bilingual word alignment model using a word-aligned labeled bilingual corpus; word-aligning a plurality of bilingual sentence pairs in a unlabeled bilingual corpus using said bilingual word alignment model; determining whether the word alignment of each of said plurality of bilingual sentence pairs is correct, and if it is correct, adding the bilingual sentence pair into the labeled bilingual corpus and removing the bilingual sentence pair from the unlabeled bilingual corpus; retraining the bilingual word alignment model using the expanded labeled bilingual corpus; and re-word-aligning the remaining bilingual sentence pairs in the unlabeled bilingual corpus using the retrained bilingual word alignment model.

12 Claims, 4 Drawing Sheets

OTHER PUBLICATIONS

Wu et al., Boosting Statistical Word alignment, 2005, Citeseer, pp. 313-320.*

Wu et al., Improving Statistical Word Alignment with a Rule-Based Machine Translation System, 2004, Internation Conference on Computational Linguistics, pp. 1-7.*

Yamada et al. (Yamada), Improving Translation Models by Applying Asymmetric Learning, 2003, Proceedings of MT Sumit IX, pp. 1-7.*

Wu et al., Alignment Model Adaptation for Domain-Specific Word Alignment, 2005, Ann Arbor, pp. 467-474.*

Moore et al., Fast and Accurate Sentence Alignment of Bilingual Corpora, 2002, Springer, pp. 135-144.*

Callison-Burch, Active learning for Statistical Machine Translation, 2003, PHD Proposal, Edinburg University, pp. 1-29 (29 pages).*

* cited by examiner

METHOD AND APPARATUS FOR BILINGUAL WORD ALIGNMENT, METHOD AND APPARATUS FOR TRAINING BILINGUAL WORD ALIGNMENT MODEL

TECHNICAL FIELD

The present invention relates to information processing techniques, specifically, to the technique of bilingual word alignment and the technique of statistical machine translation in natural language processing.

BACKGROUND OF THE INVENTION

Word alignment is widely used in natural language processing. Existing word alignment technique usually uses a statistical word alignment model to make correspondence between a pair of words, each of which is a translation of the other, in a bilingual sentence. The statistical word alignment model contains statistical information used for determining a pair of words, each of which is a translation of the other, in a bilingual sentence.

In the article by P. F. Brown, S. A. Della Pietra, V. J. Della Pietra and R. Mercer published in 1993,"The Mathematics of Statistical Machine Translation: Parameter Estimation" (Computational Linguistics, 19(2): 263-311), a statistical machine translation model and a statistical word alignment model as well as corresponding parameter estimation method are described.

However, since the current statistical word alignment model uses large-scale unlabeled bilingual corpus to train a statistical word alignment model without supervision, such a statistical word alignment model could lead to producing many erroneous word alignment results. If a bilingual corpus, of which the word alignment is manually labeled, is used to make training in a supervised way, an alignment model with higher accuracy can be obtained.

On the other hand, it is a laborious work to align the words in a large-scale bilingual corpus manually. If only a small-scale corpus needs to be manually labeled, it will not take too much labor and time.

SUMMARY OF THE INVENTION

In order to solve above-mentioned problems of the existing techniques, the present invention provides a method and apparatus for bilingual word alignment as well as a method and apparatus for training a bilingual word alignment model.

According to an aspect of the present invention, there is provided a method for bilingual word alignment, comprising: training a bilingual word alignment model using a word-aligned labeled bilingual corpus; word-aligning a plurality of bilingual sentence pairs in a unlabeled bilingual corpus using said bilingual word alignment model; determining whether the word alignment of each of said plurality of bilingual sentence pairs is correct, and if it is correct, adding the bilingual sentence pair into the labeled bilingual corpus and removing the bilingual sentence pair from the unlabeled bilingual corpus; retraining the bilingual word alignment model using the expanded labeled bilingual corpus; and re-word-aligning the remaining bilingual sentence pairs in the unlabeled bilingual corpus using the retrained bilingual word alignment model.

According to another aspect of the present invention, there is provided a method for training a bilingual word alignment model, comprising: training an initial bilingual word alignment model using a word-aligned labeled bilingual corpus; word-aligning a plurality of bilingual sentence pairs in a unlabeled bilingual corpus using said initial bilingual word alignment model; determining whether the word alignment of each of said plurality of bilingual sentence pairs is correct, and if it is correct, adding the bilingual sentence pair into the labeled bilingual corpus and removing the bilingual sentence pair from the unlabeled bilingual corpus; training a bilingual word alignment model using the expanded labeled bilingual corpus.

According to another aspect of the present invention, there is provided an apparatus for bilingual word alignment, comprising: a model training unit configured to train a bilingual word alignment model using a word-aligned labeled bilingual corpus; a word-aligning unit configured to word-align a plurality of bilingual sentence pairs in a unlabeled bilingual corpus using said bilingual word alignment model; a determining unit configured to determine whether the word alignment of each of said plurality of bilingual sentence pairs is correct, and if it is correct, to add the bilingual sentence pair into the labeled bilingual corpus and to remove the bilingual sentence pair from the unlabeled bilingual corpus; a model retraining unit configured to retrain the bilingual word alignment model using the labeled bilingual corpus expanded by said determining unit; and a re-word-aligning unit configured to re-word-align the remaining bilingual sentence pairs in the unlabeled bilingual corpus using the retrained bilingual word alignment model.

According to another aspect of the present invention, there is provided an apparatus for training a bilingual word alignment model, comprising: an initial model training unit configured to train an initial bilingual word alignment model using a word-aligned labeled bilingual corpus; a word-aligning unit configured to word-align a plurality of bilingual sentence pairs in a unlabeled bilingual corpus using said initial bilingual word alignment model; a determining unit configured to determine whether the word alignment of each of said plurality of bilingual sentence pairs is correct, and if it is correct, to add the bilingual sentence pair into the labeled bilingual corpus and removing the bilingual sentence pair from the unlabeled bilingual corpus; and a model training unit configured to train a bilingual word alignment model using the labeled bilingual corpus expanded by said determining unit.

BRIEF DESCRIPTION OF THE DRAWINGS

It is believed that above-mentioned features, advantages and objectives of the present invention will be better understood through following description of the embodiments of the invention, taken in conjunction with the drawings in which.

DETAILED DESCRIPTION OF THE INVENTION

Next, in conjunction with the drawings, a detailed description will be given to the preferred embodiments of the present invention.

Figure 1:
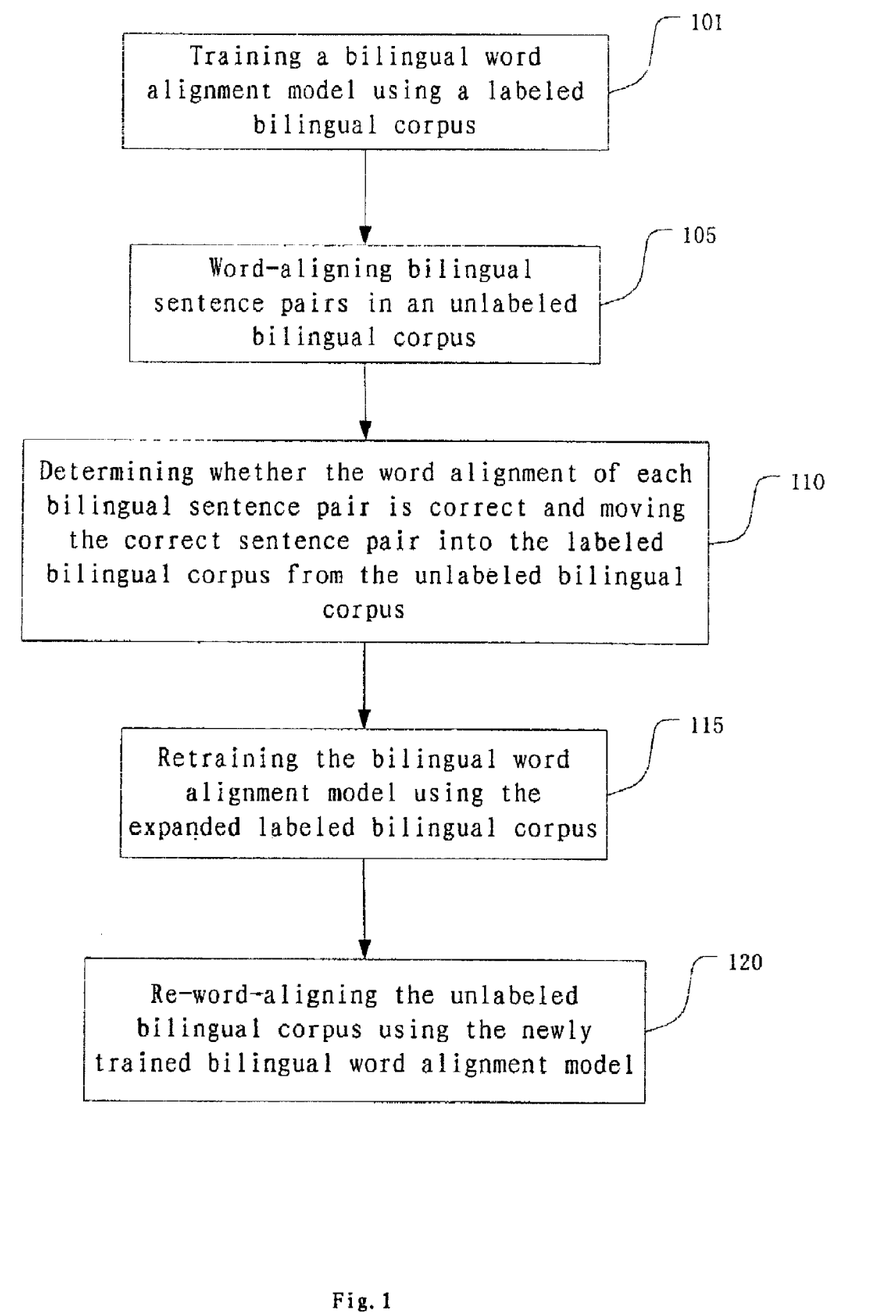
FIG. 1 is a flowchart showing a method for bilingual word alignment according to an embodiment of the present invention.

FIG. 1 is a flowchart showing a method for bilingual word alignment according to an embodiment of the present invention;

As shown in FIG. 1, first in Step 101, a bilingual word alignment model is trained using a word-aligned labeled bilingual corpus. In this step, the labeled corpus is a bilingual corpus that is manually labeled for word alignment by professionals (such as translators), in which a plurality of bilingual sentence pairs and the word alignment information of each bilingual sentence pair are included, wherein each sentence pair has a sentence that is the translation of the other sentence in the pair. Though the larger the labeled bilingual corpus is, the better the performance of the system is, it takes labor and time to make word alignment manually, thus, the labeled corpus is very small relative to an unlabeled corpus described later.

In this embodiment, the bilingual word alignment model is a statistical word alignment model, including at least a word translation possibility, a position distortion possibility and a word fertility possibility, wherein the word translation probability $p(w_s/w_t)$ is the probability with which a word $w_t$ in the target language is translated to a word $w_s$ in the source language; the position distortion probability $p(j/i, l, m)$ is the probability with which the $l^{th}$ position in the sentence of the target language corresponds to the $j^{th}$ position in the sentence of the source language under the condition of giving m as the length of the sentence in the source language and l as the length of the sentence in the target language. The word fertility probability $p(\phi_i/w_t)$ is the probability with which the word wt in the target language corresponds to $\phi_i$ words in the source language.

Besides, in this embodiment, the bilingual word alignment model includes a forward bilingual word alignment model and a backward bilingual word alignment model. In this step, using labeled bilingual corpus to train a forward bilingual word alignment model and to train a backward bilingual word alignment model. For instance, for Chinese/English bilingual corpus, it is needed to train a Chinese-English word alignment model and an English-Chinese word alignment model.

Next, in Step 105, the bilingual word alignment model trained in above Step 101 is used to word-align a plurality of bilingual sentence pairs in the unlabeled bilingual corpus. In this embodiment, a bilingual word alignment model, including a translation probability, a position distortion probability and a word fertility probability, is used. The specific alignment manner is:

1. The word translation probability and the position alignment probability are used to find an optimal word alignment for each source language word so as to obtain an alignment series A0.

2. On the basis of the alignment series Ai, the word translation probability, position distortion model and the word fertility model are used to find a better alignment series Ai+1 through trying exchanging any two alignments or changing an alignment.

3. The process 2 is repeated till no better alignment series is found.

Here, those skilled in the art should understand that any known and future searching algorithms can be used to search an optimal alignment series.

In this step, the bilingual word alignment model trained in above Step 101 is used to word-align a plurality of bilingual sentence pairs in the unlabeled bilingual corpus, so as to obtain a forward word alignment result and a backward word alignment result respectively.

Next, in Step 110, it is determined whether the word alignment of each bilingual sentence pair is correct or not. If it is correct, the aligned bilingual sentence pair that is determined to be correct is added to the labeled bilingual corpus and deleted from the unlabeled bilingual corpus.

Specifically, in this embodiment, intersection $A_1 \cap A_2$ of the forward word alignment result $A_1$ and the backward word alignment result $A_2$ is calculated for each bilingual sentence pair;

Union $A_1 \cup A_2$ of the forward word alignment result $A_1$ and the backward word alignment result $A_2$ is calculated for the bilingual sentence pair;

If the ratio R of the number of elements in above intersection $A_1 \cap A_2$ to the number of elements in above union $A_1 \cup A_2$, $$R = \frac{\#(A_1 \cap A_2)}{\#(A_1 \cup A_2)},$$

is larger than a predetermined threshold th, the word alignment of this bilingual sentence pair is determined to be correct, otherwise, the word alignment of this bilingual sentence pair is determined to be incorrect. For a bilingual sentence pair with correct word alignment, it is removed from the unlabeled corpus to the labeled corpus.

Besides, in this step, if the forward word alignment result of the bilingual sentence pair is not identical to the backward word alignment result, that is, if th<R<1, the word translation probabilities of the different parts in above forward word alignment result and above backward word alignment result are calculated respectively, and the word alignment result with a higher word translation probability is added to above labeled bilingual corpus.

For instance, for an English-Chinese sentence pair:

English: Please put the red jacket on the bed.

Chinese: 请 把 红色 的 夹克 放 在 床 上 。

Using the word alignment model we obtain following forward and backward alignment results:

English-Chinese alignment (forward)

Chinese-English alignment (backward)

At this time,

(A1)=7//the number of forward alignments
(A2)=7//the number of backward alignments in the Chinese-English alignment result, there is "on<->在" and in the English-Chinese alignment result, there is "on<->在...上". Thus,

(A1∩A2)=6//the number of alignments that appears both in the forward alignment result and in the backward alignment result (an alignment that appears both in the forward alignment result and in the backward alignment result is taken as one alignment)

(A1∪A2)=8//the number of alignments in the forward and backward alignments all together Thus, based on the definition $$R = \frac{\#(A_1 \cap A_2)}{\#(A_1 \cup A_2)},$$

R=6/8=0.75>0.7. (suppose the predetermined threshold th is 0.7)

So the obtained alignments of the exemplary sentence meet the requirement. Then, for the alignments that don't appear in A1∩A2, a "word alignment probability" is used to determine which alignment is correct. For the above example, there is "on<->在" and "on<->在...上". The probabilities of these two alignments are calculated respectively, and the probability of "on<->在...上" is larger, so "on<->在...上" is selected. The exemplary sentence and the processed alignments are saved in the labeled collection. That is, the following result is saved in the labeled collection.

英语: Please put the red jacket on the bed.
汉语: 请 把 红色 的 夹克 放 在 床 上 。

Next, in Step 115, the expanded labeled bilingual corpus is used to retrain the bilingual word alignment model. Similar to above Step 101, in this step, the expanded labeled bilingual corpus is used to train the forward bilingual word alignment model and the backward bilingual word alignment model.

Next, in Step 120, above bilingual word alignment model is used to re-word-align the remaining bilingual sentence pairs in the unlabeled bilingual corpus.

From above description it can be seen that, if the method of this embodiment for bilingual word alignment is used, due to using a bilingual corpus manually labeled for word alignment to make supervised training, an alignment model with higher accuracy can be obtained; at the same time, since the scale of the labeled bilingual corpus is much smaller than that of an unlabeled corpus, manually labeling will not take too much labor and time. Thus, the method of this embodiment for bilingual word alignment can word-align sentence pairs in the unlabeled corpus more accurately than the existing word-alignment methods.

Besides, according to another embodiment of the present invention, after Step 120, above determination (Step 110), retraining (Step 115) and the step of re-word-alignment (Step 120) are further repeated till not any new correct word alignment is produced. Thus, the new alignment result can be used to further perfect the alignment model, so as to improve the accuracy of the word alignment.

Figure 2:
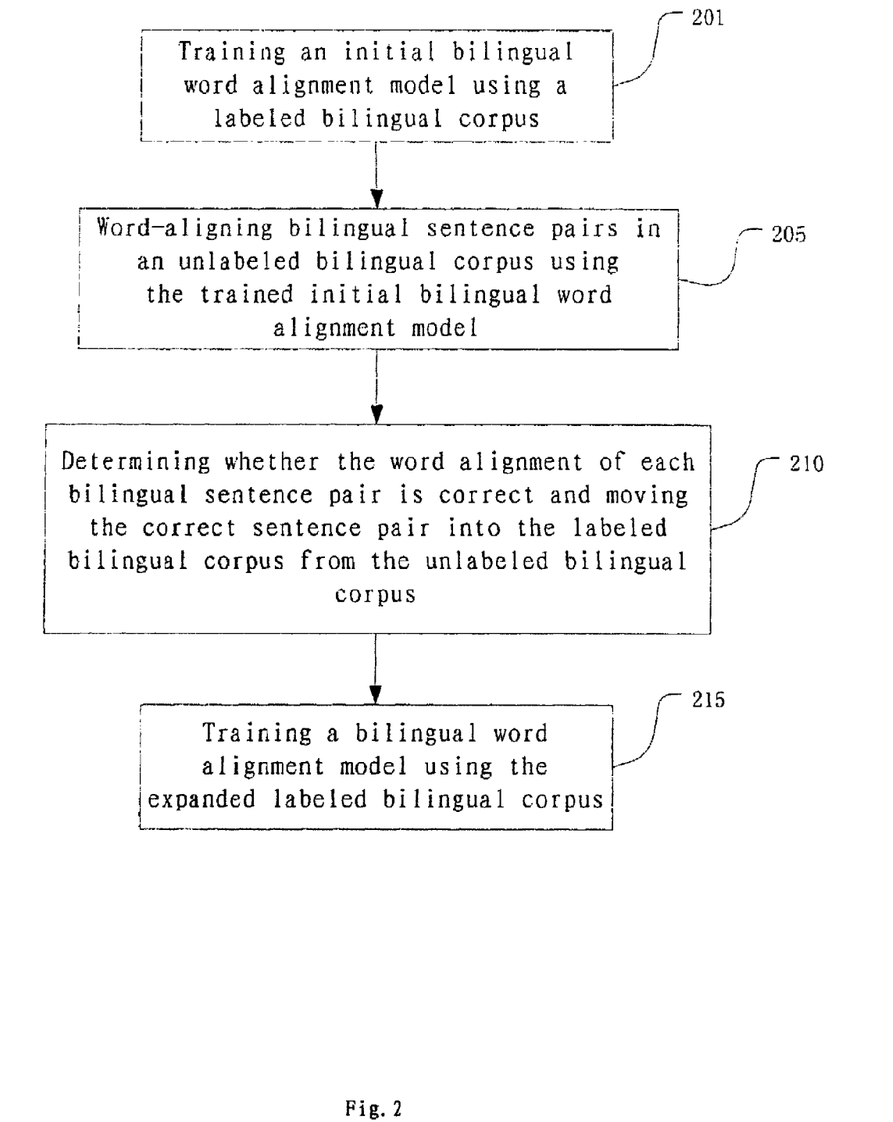
FIG. 2 is a flowchart showing a method for training a bilingual word alignment model according to an embodiment of the present invention.

Under the same inventive concept, FIG. 2 is a flowchart showing a method for training a bilingual word alignment model according to an embodiment of the present invention. Next, in conjunction with the figure, a description will be given to this embodiment. For the parts identical to that in the previous embodiment, explanation will be omitted properly.

As shown in FIG. 2, first in Step 201, the labeled bilingual corpus is used to train an initial bilingual word alignment model. Similar to Step 101 shown in FIG. 1, the labeled corpus is a bilingual corpus that is manually labeled for word alignment by professionals (such as translators), in which a plurality of bilingual sentence pairs and the word alignment information of each bilingual sentence pair are included, wherein each sentence pair has a sentence that is the translation of the other sentence in the pair.

Besides, in this embodiment, the bilingual word alignment model includes a forward bilingual word alignment model and a backward bilingual word alignment model. In this step, the labeled bilingual corpus is used to train the forward bilingual word alignment model and to train the backward bilingual word alignment model.

Next, in Step 205, the trained initial bilingual word alignment model is used to word-align a plurality of bilingual sentence pair in the unlabeled bilingual corpus. Similar to Step 105 shown in FIG. 1, in this embodiment, a bilingual word alignment model, including a translation probability, a position distortion probability and a word fertility probability, is used. The specific alignment manner is:

1. The word translation probability and the position alignment probability are used to find an optimal word alignment for each source language word so as to obtain an alignment series A0.

2. On the basis of the alignment series Ai, the word translation probability, position distortion model and the word fertility model are used to find a better alignment series Ai+1 through trying exchanging any two alignments or changing an alignment.

3. The process 2 is repeated till no better alignment series is found.

Here, those skilled in the art should understand that any known and future searching algorithms can be used to search an optimal alignment series.

In this step, the trained initial bilingual word alignment model is used to word-align a plurality of bilingual sentence pairs in the unlabeled bilingual corpus, so as to obtain a forward word alignment result and a backward word alignment result respectively.

Next, in Step 210, it is determined whether the word alignment of each bilingual sentence pair is correct or not. If it is correct, the aligned bilingual sentence pair that is determined to be correct is added to the labeled bilingual corpus and deleted from the unlabeled bilingual corpus.

Specifically, in this embodiment, intersection $A_1 \cap A_2$ of the forward word alignment result $A_1$ and the backward word alignment result $A_2$ is calculated for each bilingual sentence pair;

Union $A_1 \cup A_2$ of the forward word alignment result $A_1$ and the backward word alignment result $A_2$ is calculated for the bilingual sentence pair;

If the ratio R of the number of elements in above intersection $A_1 \cap A_2$ to the number of elements in above union $A_1 \cup A_2$, $$R = \frac{\#(A_1 \cap A_2)}{\#(A_1 \cup A_2)},$$

is larger than a predetermined threshold th, the word alignment of this bilingual sentence pair is determined to be correct, otherwise, the word alignment of this bilingual sentence pair is determined to be incorrect. For a bilingual sentence pair with correct word alignment, it is moved from the unlabeled corpus to the labeled corpus.

Besides, in this step, if the forward word alignment result of the bilingual sentence pair is not identical to the backward word alignment result, that is, if th<R<1, the word translation probabilities of the different parts in above forward word alignment result and above backward word alignment result are calculated respectively, and the word alignment result with a higher word translation probability is added to above labeled bilingual corpus.

Next, in Step 215, the expanded labeled bilingual corpus is used to retrain the bilingual word alignment model. In this step, the expanded labeled bilingual corpus is used to train the forward bilingual word alignment model and the backward bilingual word alignment model.

From above description it can be seen that, if the method of this embodiment for bilingual word alignment is used, due to using a bilingual corpus manually labeled for word alignment to make supervised training, an initial alignment model with high accuracy can be obtained; further, the initial word alignment model is used to word-align the unlabeled corpus and the alignment result determined to be correct is used to expand the labeled corpus so as to train a bilingual word alignment model. Thus, it will not take too much labor and time, at the same time, the quality of the trained word alignment model can be guaranteed.

Besides, according to another embodiment of the present invention, after Step 215, above newly trained bilingual word alignment model is used to re-word-align the remaining bilingual sentence pairs and above determination (Step 210), retraining (Step 215) and the step of re-word-alignment are further repeated till not any new correct word alignment is produced. Thus, the new alignment result can be used to further perfect the alignment model.

Figure 3:
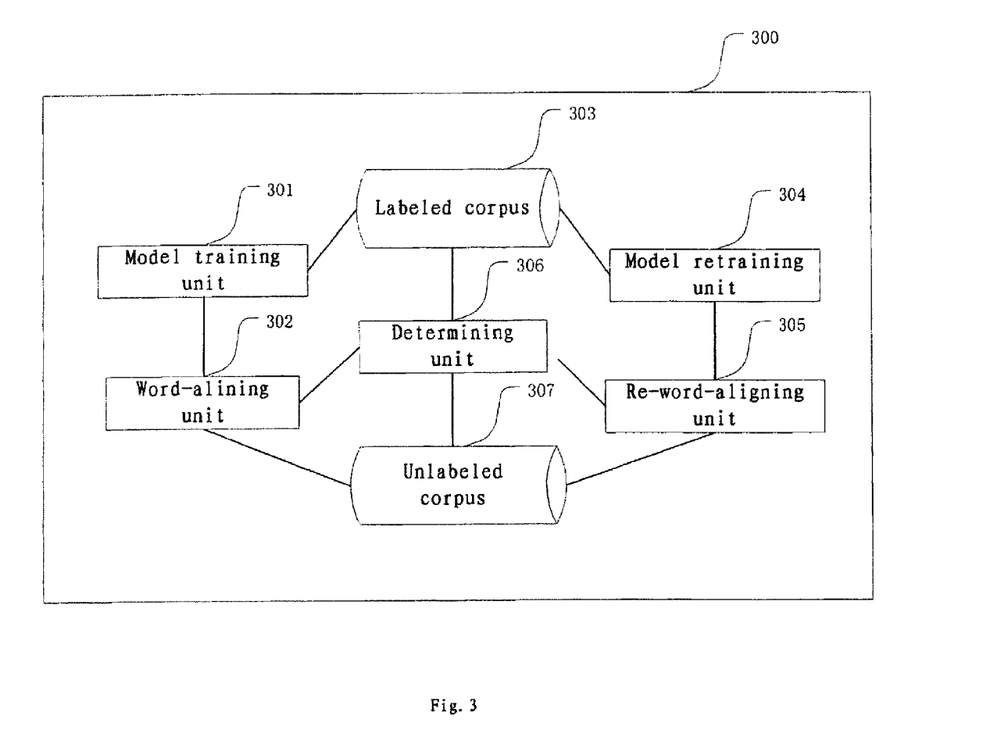
FIG. 3 is a block diagram showing an apparatus for bilingual word alignment according to an embodiment of the present invention.

FIG. 3 is a block diagram showing an apparatus for bilingual word alignment according to an embodiment of the present invention. Next, in conjunction with the figure, a description will be given to this embodiment. For the parts identical to that in the previous embodiments, explanation will be omitted properly.

As shown in FIG. 3, the apparatus 300 for bilingual word alignment of this embodiment comprises: a labeled corpus 303 containing word-aligned labeled bilingual sentence pairs; an unlabeled corpus 307 containing unlabeled bilingual sentence pairs; a model training unit 301 configured to train a bilingual word alignment model using the labeled bilingual corpus 303; a word-aligning unit 302 configured to word-align a plurality of bilingual sentence pairs in the unlabeled bilingual corpus using said bilingual word alignment model; a determining unit 306 configured to determine whether the word alignment of each of said plurality of bilingual sentence pairs is correct, and if it is correct, to add the bilingual sentence pair into the labeled bilingual corpus 303 and to remove the bilingual sentence pair from the unlabeled bilingual corpus 307; a model retraining unit 304 configured to retrain the bilingual word alignment model using the labeled bilingual corpus 303 expanded by said determining unit 306; and a re-word-aligning unit 305 configured to re-word-align the remaining bilingual sentence pairs in the unlabeled bilingual corpus 307 using the bilingual word alignment model retrained by the model retraining unit 304.

Similar to the embodiment shown in FIG. 1, in this embodiment, the bilingual word alignment model includes at least word translation probabilities, position distortion probabilities and word fertility probabilities. And the model training unit 301 uses the labeled bilingual corpus to train a forward bilingual word alignment model, and uses the labeled bilingual corpus to train a backward bilingual word alignment model; the word aligning unit 302 uses the forward bilingual word alignment model to forward-word-align each of the bilingual sentence pairs and uses the backward bilingual word alignment model to backward-word-align each of the bilingual sentence pairs; the determining unit 306 calculates the intersection $A_1 \cap A_2$ of the forward word alignment result $A_1$ and the backward word alignment result $A_2$ of each of the bilingual sentence pairs; calculates the union $A_1 \cup A_2$ of the forward word alignment result $A_1$ and the backward word alignment result $A_2$ of the bilingual sentence pair; If the ratio R of the number of elements in above intersection $A_1 \cap A_2$ to the number of elements in above union $$R = \frac{\#(A_1 \cap A_2)}{\#(A_1 \cup A_2)},$$

is larger than a predetermined threshold th, the word alignment of this bilingual sentence pair is determined to be correct, otherwise, the word alignment of this bilingual sentence pair is determined to be incorrect. For a bilingual sentence pair with correct word alignment, it is removed from the unlabeled corpus to the labeled corpus. If the forward word alignment result of the bilingual sentence pair is not identical to the backward word alignment result, the word translation probabilities of the different parts in above forward word alignment result and above backward word alignment result are calculated respectively, and the word alignment result with a higher word translation probability is added to above labeled bilingual corpus.

The model retraining unit 304 uses the expanded labeled corpus to retrain the forward bilingual word alignment model and uses the expanded labeled corpus to retrain the backward bilingual word alignment model.

From above description it can be seen that, the apparatus of this embodiment for bilingual word alignment can implement above described methods for bilingual word alignment of the embodiments of the present invention, so as to word-align sentence pairs in the unlabeled corpus more accurately than the existing methods for word alignment, and it will not take too much labor and time.

Besides, according to another embodiment of the present invention, for a sentence pair word-aligned by the re-word-aligning unit 305, re-determination can be made by the determining unit 306 so as to expand the labeled corpus 303 once more; as described in the previous embodiments, the steps of determining, retraining and re-word-aligning are repeated till not any new correct word alignment is produced. Thus, the new alignment result can be used to further perfect the alignment model so as to improve the accuracy of the word alignment.

Here it should be noted that the apparatus 300 for bilingual word alignment and its components can be constructed with dedicated circuits or chips, or can be realized by a computer (processor) through executing corresponding programs.

Figure 4:
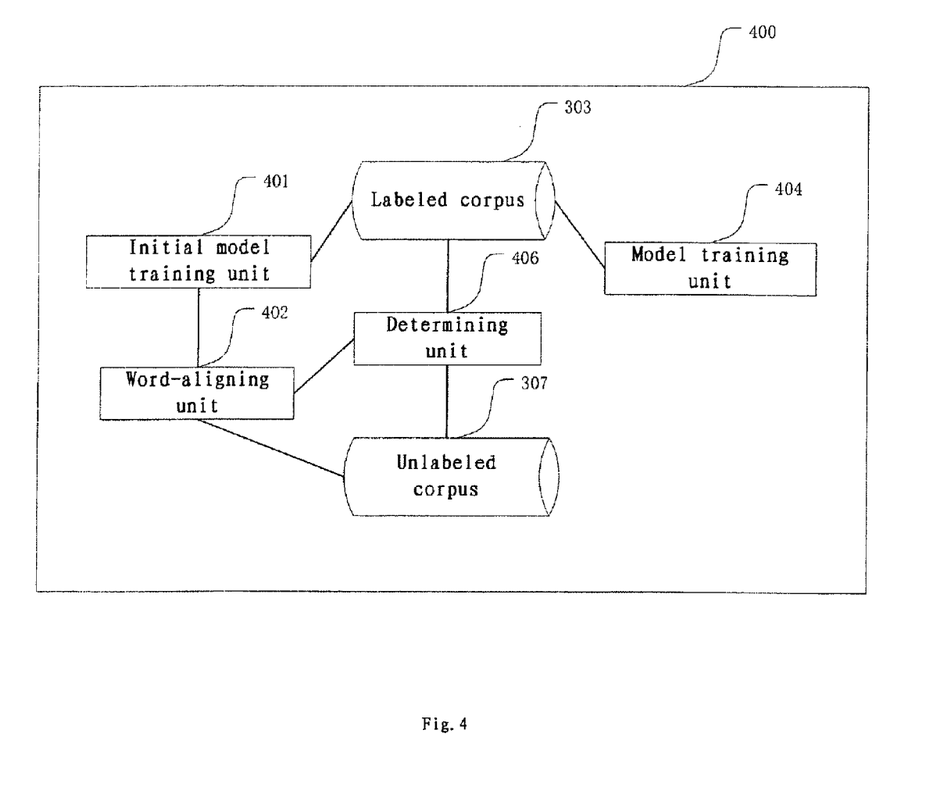
FIG. 4 is a block diagram showing an apparatus for training a bilingual word alignment model according to an embodiment of the present invention.

FIG. 4 is a block diagram showing an apparatus for training a bilingual word alignment model according to an embodiment of the present invention. Next, in conjunction with the figure, a description will be given to this embodiment. For the parts identical to that in the previous embodiments, explanation will be omitted properly.

As shown in FIG. 4, the apparatus 400 for training a bilingual word alignment model of this embodiment comprises: a labeled corpus 303 containing word-aligned labeled bilingual sentence pairs; an unlabeled corpus 307 containing unlabeled bilingual sentence pairs; an initial model training unit 401 configured to train a bilingual word alignment model using the word-aligned labeled bilingual corpus in the labeled corpus 303; a word-aligning unit 402 configured to word-align a plurality of bilingual sentence pairs in the unlabeled bilingual corpus using said initial bilingual word alignment model; a determining unit 406 configured to determine whether the word alignment of each of said plurality of bilingual sentence pairs is correct, and if it is correct, to remove the bilingual sentence pair into the labeled bilingual corpus 303 from the unlabeled bilingual corpus 307; a model retraining unit 404 configured to train a bilingual word alignment model using the labeled bilingual corpus expanded by said determining unit 406.

Similar to the embodiment shown in FIG. 2, in this embodiment, the bilingual word alignment model at least includes a translation probability, a position distortion probability and a word fertility probability. And the initial model training unit 401 uses the labeled bilingual corpus to train a forward bilingual word alignment model, and uses the labeled bilingual corpus to train a backward bilingual word alignment model; the word aligning unit 402 uses the forward bilingual word alignment model to forward-word-align each of the bilingual sentence pairs and uses the backward bilingual word alignment model to backward-word-align each of the bilingual sentence pairs; the determining unit 406 calculates the intersection $A_1 \cap A_2$ of the forward word alignment result $A_1$ and the backward word alignment result $A_2$ of each of the bilingual sentence pairs; calculates the union $A_1 \cup A_2$ of the forward word alignment result $A_1$ and the backward word alignment result $A_2$ of the bilingual sentence pair; If the ratio R of the number of elements in above intersection $A_1 \cap A_2$ to the number of elements in above union $$R = \frac{\#(A_1 \cap A_2)}{\#(A_1 \cup A_2)},$$

is larger than a predetermined threshold th, the word alignment of this bilingual sentence pair is determined to be correct, otherwise, the word alignment of this bilingual sentence pair is determined to be incorrect. For a bilingual sentence pair with correct word alignment, it is removed from the unlabeled corpus to the labeled corpus. If the forward word alignment result of the bilingual sentence pair is not identical to the backward word alignment result, the word translation probabilities of the different parts in above forward word alignment result and above backward word alignment result are calculated respectively, and the word alignment result with a higher word translation probability is added to above labeled bilingual corpus.

From above description it can be seen that, the apparatus of this embodiment for training a bilingual word alignment model can implement above described methods for training a bilingual word alignment model of the embodiments of the present invention. Due to using a bilingual corpus manually labeled for word alignment to make supervised training, an initial alignment model with high accuracy can be obtained; further, the initial word alignment model is used to word-align the unlabeled corpus and the alignment result determined to be correct is used to expand the labeled corpus so as to train a bilingual word alignment model. Thus, it will not take too much labor and time, at the same time, the quality of the trained word alignment model can be guaranteed.

Besides, according to another embodiment of the present invention, the model training unit 404 uses the expanded labeled corpus to train a forward bilingual word alignment model and uses the expanded labeled corpus to train a backward bilingual word alignment model. The word-aligning unit 402 further uses the bilingual word alignment model newly trained by the model training unit 404 to re-word-align the remaining bilingual sentence pairs in the unlabeled corpus 307. As described in above embodiments, the steps of determination, training and re-word-alignment are repeated till not any new correct word alignment is produced. Thus, the new alignment result can be used to further perfect the word alignment model.

Here it should be noted that the apparatus 400 for training a bilingual word alignment model and its components can be constructed with dedicated circuits or chips, or can be realized by a computer (processor) through executing corresponding programs.

Though a method and apparatus for bilingual word alignment and a method and apparatus for training a bilingual word alignment model of the present invention have been described in details with some exemplary embodiments, these embodiments are not exhaustive, those skilled in the art may make various variations and modifications within the spirit and scope of the present invention. Thus, the present invention is not limited to these embodiments, and the scope of the present invention is only defined by the appended claims.

The invention claimed is:

1. A method for bilingual word alignment by a processor executing instructions, comprising:

training a bilingual word alignment model using a word-aligned labeled bilingual corpus;

word-aligning a plurality of bilingual sentence pairs in an unlabeled bilingual corpus using said bilingual word alignment model;

determining whether the word alignment of each of said plurality of bilingual sentence pairs is correct, and when the word alignment is correct, adding the bilingual sentence pair into the labeled bilingual corpus and removing the bilingual sentence pair from the unlabeled bilingual corpus;

retraining the bilingual word alignment model using the expanded labeled bilingual corpus; and re-word-aligning the remaining bilingual sentence pairs in the unlabeled bilingual corpus using the retrained bilingual word alignment model, said step of training a bilingual word alignment model comprising:

training a forward bilingual word alignment model using the word-aligned labeled bilingual corpus; and training a backward bilingual word alignment model using the word-aligned labeled bilingual corpus, said step of word-aligning a plurality of bilingual sentence pairs in an unlabeled bilingual corpus comprising:

forward-word-aligning each of said plurality of bilingual sentence pairs using said forward bilingual word alignment model; and backward-word-aligning each of said plurality of bilingual sentence pairs using said backward bilingual word alignment model, and said step of determining whether the word alignment of each of said plurality of bilingual sentence pairs is correct comprising:

calculating an intersection set between the forward-word-aligning result and the backward-word-aligning result of the bilingual sentence pair;

calculating a union set between the forward-word-aligning result and the backward-word-aligning result of the bilingual sentence pair; and determining, when the ratio of an element number of said intersection set to an element number of said union set is greater than a predetermined threshold, the word alignment of said bilingual sentence pair is correct.

2. The method for bilingual word alignment according to claim 1, wherein said step of retraining the bilingual word alignment model comprises:

retraining the forward bilingual word alignment model using said expended labeled bilingual corpus; and retraining the backward bilingual word alignment model using said expended labeled bilingual corpus.

3. The method for bilingual word alignment according to claim 1, wherein said step of adding the bilingual sentence pair into the labeled bilingual corpus comprises:

calculating, when the forward-word-aligning result and the backward-word-aligning result are not identical, word translation probabilities of the different portions in the forward-word-aligning result and the backward-word-aligning result, and adding the word-aligning result having higher word translation probability into the labeled bilingual corpus.

4. A method for training a bilingual word alignment model by a processor executing instructions, comprising:

training an initial bilingual word alignment model using a word-aligned labeled bilingual corpus;

word-aligning a plurality of bilingual sentence pairs in an unlabeled bilingual corpus using said initial bilingual word alignment model;

determining whether the word alignment of each of said plurality of bilingual sentence pairs is correct, and when the word alignment is correct, adding the bilingual sentence pair into the labeled bilingual corpus and removing the bilingual sentence pair from the unlabeled bilingual corpus; and training a bilingual word alignment model using the expanded labeled bilingual corpus, said step of training an initial bilingual word alignment model comprising:

training a forward initial bilingual word alignment model using the word-aligned labeled bilingual corpus; and training a backward initial bilingual word alignment model using the word-aligned labeled bilingual corpus, said step of word-aligning a plurality of bilingual sentence pairs in an unlabeled bilingual corpus comprising:

forward-word-aligning each of said plurality of bilingual sentence pairs using said forward initial bilingual word alignment model; and backward-word-aligning each of said plurality of bilingual sentence pairs using said backward initial bilingual word alignment model, and said step of determining whether the word alignment of each of said plurality of bilingual sentence pairs is correct comprising:

calculating an intersection set between the forward-word-aligning result and the backward-word-aligning result of the bilingual sentence pair;

calculating a union set between the forward-word-aligning result and the backward-word-aligning result of the bilingual sentence pair; and determining, when the ratio of an element number of said intersection set to an element number of said union set is greater than a predetermined threshold, the word alignment of said bilingual sentence pair is correct.

5. The method for training bilingual word alignment model according to claim 4, wherein said step of training the bilingual word alignment model comprises:

training a forward bilingual word alignment model using said expended labeled bilingual corpus; and training a backward bilingual word alignment model using said expended labeled bilingual corpus.

6. The method for training bilingual word alignment model according to claim 4, wherein said step of adding the bilingual sentence pair into the labeled bilingual corpus comprises:

calculating, when the forward-word-aligning result and the backward-word-aligning result are not identical, word translation probabilities of the different portions in the forward-word-aligning result and the backward-word-aligning result, and adding the word-aligning result having higher word translation probability into the labeled bilingual corpus.

7. An apparatus for bilingual word alignment, comprising:

a model training unit configured to train a bilingual word alignment model using a word-aligned labeled bilingual corpus;

a word-aligning unit configured to word-align a plurality of bilingual sentence pairs in an unlabeled bilingual corpus using said bilingual word alignment model;

a determining unit configured to determine whether the word alignment of each of said plurality of bilingual sentence pairs is correct, and when the word alignment is correct, to add the bilingual sentence pair into the labeled bilingual corpus and to remove the bilingual sentence pair from the unlabeled bilingual corpus;

a model retraining unit configured to retrain the bilingual word alignment model using the labeled bilingual corpus expanded by said determining unit; and a re-word-aligning unit configured to re-word-align the remaining bilingual sentence pairs in the unlabeled bilingual corpus using the retrained bilingual word alignment model, wherein said model training unit trains a forward bilingual word alignment model using the word-aligned labeled bilingual corpus, and trains a backward bilingual word alignment model using the word-aligned labeled bilingual corpus, said word-aligning unit forward-word-aligns each of said plurality of bilingual sentence pairs using said forward bilingual word alignment model, and backward-word-aligns each of said plurality of bilingual sentence pairs using said backward bilingual word alignment model, said determining unit calculates an intersection set between the forward-word-aligning result and the backward-word-aligning result of the bilingual sentence pair, calculates a union set between the forward-word-aligning result and the backward-word-aligning result of the bilingual sentence pair, and determines, when the ratio of an element number of said intersection set to an element number of said union set is greater than a predetermined threshold, the word alignment of said bilingual sentence pair is correct.

8. The apparatus for bilingual word alignment according to claim 7, wherein said model retraining unit retrains the forward bilingual word alignment model using said expended labeled bilingual corpus, and retrains the backward bilingual word alignment model using said expended labeled bilingual corpus.

9. The apparatus for bilingual word alignment according to claim 7, wherein said determining unit further calculates word translation probabilities of the different portions in the forward-word-aligning result and the backward-word-aligning result, when the forward-word-aligning result and the backward-word-aligning result are not identical, and adds the word-aligning result having higher word translation probability into the labeled bilingual corpus.

10. An apparatus for training bilingual word alignment model, comprising:
an initial model training unit configured to train an initial bilingual word alignment model using a word-aligned labeled bilingual corpus;
a word-aligning unit configured to word-align a plurality of bilingual sentence pairs in an unlabeled bilingual corpus using said initial bilingual word alignment model;
a determining unit configured to determine whether the word alignment of each of said plurality of bilingual sentence pairs is correct, and when the word alignment is correct, to add the bilingual sentence pair into the labeled bilingual corpus and removing the bilingual sentence pair from the unlabeled bilingual corpus; and
a model training unit configured to train a bilingual word alignment model using the labeled bilingual corpus expanded by said determining unit, wherein
said initial model training unit trains a forward initial bilingual word alignment model using the word-aligned labeled bilingual corpus, and trains a backward initial bilingual word alignment model using the word-aligned labeled bilingual corpus;
said word-aligning unit forward-word-aligns each of said plurality of bilingual sentence pairs using said forward initial bilingual word alignment model, and backward-word-aligns each of said plurality of bilingual sentence pairs using said backward initial bilingual word alignment model;
said determining unit calculates an intersection set between the forward-word-aligning result and the backward-word-aligning result of the bilingual sentence pair, calculates a union set between the forward-word-aligning result and the backward-word-aligning result of the bilingual sentence mix, and determines the word alignment of said bilingual sentence pair is correct when the ratio of an element number of said intersection set to an element number of said union set is greater than a predetermined threshold.

11. The apparatus for training bilingual word alignment model according to claim 10, wherein said model training unit trains a forward bilingual word alignment model using said labeled bilingual corpus expended by said determining unit, and trains a backward bilingual word alignment model using said labeled bilingual corpus expended by said determining unit.

12. The apparatus for training bilingual word alignment model according to claim 10, wherein said determining unit further calculates word translation probabilities of the different portions in the forward-word-aligning result and the backward-word-aligning result, when the forward-word-aligning result and the backward-word-aligning result are not identical, and adds the word-aligning result having higher word translation probability into the labeled bilingual corpus.

* * * * *